(12) United States Patent
Beerling et al.

(10) Patent No.: US 10,118,324 B2
(45) Date of Patent: Nov. 6, 2018

(54) MAGNETIC-INDUCTIVE FLOWMETER AND METHOD FOR PRODUCING A MEASURING ELECTRODE

(71) Applicant: Krohne AG, Basel (CH)

(72) Inventors: Freek Beerling, Breda (NL); Alexander Marnix Heijnsdijk, Papendrecht (NL); Josef Neven, Mours St. Eusebe (FR); Christian Nicolas, Chatuzange le Goubet (FR)

(73) Assignee: KROHNE AG, Basel (CH)

( * ) Notice: Subject to any disclaimer, the term of this patent is extended or adjusted under 35 U.S.C. 154(b) by 0 days.

(21) Appl. No.: 14/963,591

(22) Filed: Dec. 9, 2015

(65) Prior Publication Data

US 2016/0209254 A1 Jul. 21, 2016

(30) Foreign Application Priority Data

Jan. 20, 2015 (DE) .................. 10 2015 000 356
Oct. 1, 2015 (DE) .................. 10 2015 116 676

(51) Int. Cl.
| | |
|---|---|
| *B29C 45/14* | (2006.01) |
| *B29C 45/00* | (2006.01) |
| *G01F 1/58* | (2006.01) |
| *B29C 45/17* | (2006.01) |

(52) U.S. Cl.
CPC .... *B29C 45/0003* (2013.01); *B29C 45/14344* (2013.01); *G01F 1/584* (2013.01); *G01F 1/588* (2013.01); *B29C 2045/14368* (2013.01); *B29C 2045/1786* (2013.01)

(58) Field of Classification Search
CPC . G01F 1/58; G01F 1/584; G01F 1/588; B29C 45/0003; B29C 45/14344; B29C 45/14368; B29C 45/14967; B29C 2045/1786; B29C 45/14366; B29C 2045/14368; B29C 2045/14967
USPC ................ 264/267–269, 328.1, 328.7, 328.8
See application file for complete search history.

(56) References Cited

U.S. PATENT DOCUMENTS

| | | | |
|---|---|---|---|
| 4,388,834 A * | 6/1983 | Schmoock | G01F 1/584 73/861.12 |
| 5,925,830 A | 7/1999 | Schalk | |
| 6,092,428 A | 7/2000 | Brockhaus | |
| 6,453,754 B1 | 9/2002 | Florin | |
| 6,564,612 B2 | 5/2003 | Brockhaus | |
| 6,804,613 B2 | 10/2004 | Ishikawa et al. | |
| 6,843,136 B2 | 1/2005 | Hofmann et al. | |
| 7,047,821 B2 * | 5/2006 | Bitz | G01F 1/584 264/328.1 |

(Continued)

FOREIGN PATENT DOCUMENTS

| | | |
|---|---|---|
| CN | 102840887 A * | 12/2012 |
| DE | 692 32 633 T2 | 9/2002 |

(Continued)

*Primary Examiner* — Atul P. Khare
(74) *Attorney, Agent, or Firm* — David S. Safran; Roberts Mlotkowski Safran Cole & Calderon, P.C.

(57) ABSTRACT

A magnetic-inductive flowmeter with a measuring tube, a magnetic field generator and a measuring electrode in which its measuring electrodes are improved is achieved by the measuring electrode being formed of an outer electrode sheath of an electrically non-conductive plastic and of an inner electrode core of electrically conductive plastic, and by a method for producing the measuring electrode.

10 Claims, 2 Drawing Sheets

(56) References Cited

U.S. PATENT DOCUMENTS

| | | | |
|---|---|---|---|
| 7,155,983 B2 | 1/2007 | Wehrs et al. | |
| 7,343,817 B2 | 3/2008 | Wehrs et al. | |
| 7,971,493 B2 | 7/2011 | Hencken et al. | |
| 8,074,525 B2 | 12/2011 | van Willigen | |
| 8,528,417 B2 * | 9/2013 | Neuburger | G01F 1/58 |
| | | | 73/861.12 |
| 8,544,352 B2 * | 10/2013 | Glatzel | G01F 1/684 |
| | | | 73/204.22 |
| 8,615,872 B2 * | 12/2013 | Rackebrandt | B29C 45/006 |
| | | | 29/606 |
| 9,121,740 B2 | 9/2015 | Neven | |
| 2007/0062304 A1 | 3/2007 | Wehrs et al. | |
| 2012/0066301 A1 | 3/2012 | Holland | |
| 2013/0086993 A1 * | 4/2013 | Kerrom | G01F 1/584 |
| | | | 73/861.12 |

FOREIGN PATENT DOCUMENTS

| | | | | |
|---|---|---|---|---|
| DE | 101 56 031 A1 | 6/2003 | | |
| DE | 10 2010 056 077 A1 | 6/2012 | | |
| DE | 10 2014 001 479 A1 | 8/2015 | | |
| EP | 0 704 682 A2 | 4/1996 | | |
| EP | 2 469 244 A1 | 6/2012 | | |
| JP | 59168323 A * | 9/1984 | | G01F 1/584 |
| JP | 05099715 A * | 4/1993 | | |
| JP | 05099715 A * | 4/1993 | | |

* cited by examiner

MAGNETIC-INDUCTIVE FLOWMETER AND METHOD FOR PRODUCING A MEASURING ELECTRODE

BACKGROUND OF THE INVENTION

Field of the Invention

The invention relates to a magnetic-inductive flowmeter for measuring the flow of a flowing medium, having a measuring tube, having a magnetic field generator for generating a magnetic field at least partially interfusing the measuring tube and at least one measuring electrode for tapping a measuring voltage induced in the flowing medium. Furthermore, the invention relates to a method for producing a measuring electrode, which is suitable, in particular for a magnetic-inductive flowmeter.

Description of Related Art

According to Faraday's law of induction, an electric field strength is formed perpendicular to the direction of flow of the medium and perpendicular to the magnetic field in a flowing, electrically conductive medium interfused by a magnetic field. Faraday's law of induction is thus exploited in magnetic-inductive flowmeters in that a magnetic field fluctuating over time during the measurement process is usually generated by means of a magnetic field generator usually having at least one magnetic field coil, and that the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

Magnetic-inductive flowmeters have at least one measuring electrode for tapping a measuring voltage induced in an electrically conductive medium. In some implementations of the prior art, at least two measuring electrodes are present. These measuring electrodes preferably come into contact with the medium and the virtual connection line of the two measuring electrodes runs at least essentially perpendicular to the direction of the magnetic field interfusing the measuring tube perpendicular to the longitudinal axis of the measuring tube.

Magnetic-inductive flowmeters known from the prior art in German Patent DE 692 32 633 C2, DE 199 07 864 A1 and corresponding U.S. Pat. No. 6,453,754 B1, German Patent Application DE 100 64 738 B4 and corresponding U.S. Pat. No. 6,564,612 B2, German Patent Application DE 102 43 748 A1 and corresponding U.S. Pat. No. 6,804,613 B2, German Patent Application DE 10 2008 005 258 A1 and corresponding U.S. Pat. No. 7,971,493 B2 and German Patent Application DE 10 2011 112 703 A1 and corresponding U.S. Patent Application Publication 2012/0066301 A1 as well as EP 0 704 682 A1 and EP 0 834 057 A1 and corresponding U.S. Pat. No. 6,092,428 are referred to as examples. In particular, reference is made to the documents that concern problems that are relevant for magnetic-inductive flowmeters in conjunction with the measuring tubes or with the measuring electrodes, namely to German Patent Application DE 102 40 024 A1 and corresponding U.S. Pat. No. 6,843,136 B2, German Patent Application DE 10 2008 059 067 A1 and corresponding U.S. Pat. No. 8,074,525 B2, German Patent Application DE 10 2010 056 077 A1, DE 10 2012 017 904 A1 and corresponding U.S. Pat. No. 9,121,740 B2 and German Patent Application DE 10 2014 001 479 A1.

German Patent Application DE 102 40 024 A1 and corresponding U.S. Pat. No. 6,843,136 B2 describes a magnetic-inductive flowmeter, in which the measuring tube has measuring electrode channels led through its walls and the measuring electrodes are arranged in the measuring electrode channels in such a manner that their measuring electrode head is set back from the inner wall of the measuring tube. It is provided thereby that the respective inner space of the measuring electrode channel in front of the measuring electrode head is free up to the inner space of the measuring tube. In this manner, an improved signal-to-noise ratio of the measuring voltage tapped at the measuring electrodes is achieved.

In the magnetic-inductive flowmeter known from German Patent Application DE 10 2008 059 067 A1 and corresponding U.S. Pat. No. 8,074,525 B2, the measuring tube is provided at least partially with an electrically insulating protective layer on the inside. Thereby, the measuring electrodes are designed in a stripped manner and have a length—in the circumferential direction of the measuring tube—of slightly less than a quarter of the measuring tube circumference to slightly more than half of the measuring tube circumference.

German Patent Application DE 10 2010 056 077 A1 describes a magnetic-inductive flowmeter, in which the measuring tube has an insulated lining on its inner wall and the measuring electrodes consist at least in part of an electrically conductive material and have a bonded connection on the inner wall with the lining.

A magnetic-inductive flowmeter is known from German Patent Application DE 10 2012 017 904 A1 and corresponding U.S. Pat. No. 9,121,740 B2, in which the measuring tube has a metallic body and the body is provided with a thermoplastic protective layer at least on the inside of the measuring tube. Thereby, a liquid-tight connection between the thermoplastic protection layer of the measuring tube and the measuring electrodes caused by heating the protection layer is implemented at the penetration points, at which the measuring electrodes penetrate the measuring tube. Finally, a magnetic-inductive flowmeter is known from German Patent Application DE 10 2014 001 479 A1, in which the measuring tube has a circular penetration point, a support surface following the penetration point provided on the measuring tube and at least one fixing element provided spaced relative to the support surface for each measuring electrode and each measuring electrode has an electrode shaft extending through or jutting into the penetration point and an electrode head extending over the electrode shaft.

SUMMARY OF THE INVENTION

Based on the prior art, the primary object of the invention is to improve the known magnetic-inductive flowmeter in respect to its measuring electrode. This relates both to a flowmeter as well as to a method for producing a measuring electrode, in particular for a magnetic-inductive flowmeter.

The magnetic-inductive flowmeter according to the invention, in which the above described object is achieved, is initially and substantially wherein the measuring electrodes have an outer electrode sheath of electrically non-conductive plastic and of an inner electrode core of electrically conductive plastic. Overall, the measuring electrode thus is formed at least in part of an electrically conductive plastic.

In one design, the flowmeter has at least two measuring electrodes, which each are comprised of an electrode sheath and an electrode core.

In one embodiment, the electrode sheath is designed as a hollow cylinder. In a complementary or alternative design, the electrode core is cylindrical or, in particular, is a solid cylinder.

In a preferred design, it is provided that the electrode sheath is formed of a electrically non-conductive form of a plastic and the electrode core is formed of the same electrically conductive plastic—for example, using a suitable doping. In an alternative design, different plastics are used.

An implementation wherein the electrode sheath and/or the electrode core is/are produced using injection molding. It is thereby recommended to use a plastic with a relatively high processing temperature. PEEK (polyetheretherketone) is such a plastic, being a thermoplastic plastic that is stable at high temperatures and belonging to the polyaryletherktones material group. PEEK is resistant against almost all organic and inorganic chemicals. Its melting point is 335° C. Alternatively or additionally, the plastic polysulfone (PSU) is used.

In an advantageous design, the electrode sheath is at least partially formed by the measuring tube or, respectively, is implemented by the measuring tube. In this design, the electrode core is produced directly in the measuring tube so that the measuring tube represents the electrically insulating electrode sheath. In one design, the measuring tube has a recess open toward the inside in the interior of the measuring tube for this purpose.

The measuring electrodes have an outer electrode connection that is functionally necessary. Such an electrode connection can, for example, be designed like a pin. In measuring electrodes designed according to the invention, it is suggested to provide the electrode connected partially within the electrode core, preferably using a press fit. Alternatively, the electrode connection is produced directly within a recess of the electrode core, e.g., of a suitable metal using injection molding—e.g., likewise, also of an electrically conductive plastic. In one design, it is provided, in particular, that a longitudinal axis of the measuring electrode and a longitudinal axis of the electrode connection are aligned essentially perpendicular to one another. If, in one design, two electrodes are provided, then, in one design, the longitudinal axes of the two measuring electrodes lie along the virtual connection line between the two measuring electrodes.

The longitudinal axis of the measuring electrode is, in one design, given by the longitudinal axis of the electrode core. In an additional or alternative design, the longitudinal axis of the measuring electrode is given by the direction, with which a pressure on the medium or process side of the measuring electrode acts on the measuring electrode. The arrangement of the measuring electrode and electrode connection to one another allows, in particular, for the mechanical load on the electrode connection to be reduced in the event that medium or process side pressure acts on the measuring electrode.

A method for producing a measuring electrode that is suitable, in particular, for a magnetic-inductive flowmeter of the type described is part of the teaching of the invention, wherein the method is wherein the electrode sheath is produced in a first process step and the electrode core is produced in a second process step following the first process step. It is thereby recommended to carry out the first process step at a relatively high process temperature. This, for example, is possible when, as described above, the electrode sheath is made of PEEK and is thus produced of PEEK. Alternatively, polysulfone is used—in two different forms, electrically conductive and electrically non-conductive. The electrode core is, in particular, not produced separately and inserted in the electrode sheath, rather the electrode core is directly produced in the electrode sheath, so that, in particular, the electrode sheath also represents the shape for the electrode core.

The method thereby relates in general to the production of measuring electrodes for transmission of electric signals or for tapping electric signals. However, the production of measuring electrodes for magnetic-inductive flowmeters is especially discussed, wherein this is not to be seen as a limitation for the method. Alternatively, the measuring electrode can also belong to a TDR (time domain reflectometry) measuring device.

The above implementations and explanations in respect to the flowmeter also correspondingly hold true for the method or, respectively, the implementations of the method are also valid for the flowmeter, which has at least one correspondingly produced measuring electrode.

In one design, the electrode sheath and/or the electrode core is/are produced using injection molding.

A preferred implementation of the method according to the invention that is of particular importance is additionally wherein the second process step is carried out shortly after, preferably a few seconds after the first process step. This allows for the possibility of carrying out the second step at a point in time, at which the electrode sheath produced in the first step still has a relatively high temperature, preferably a temperature that is high enough that a molecular bond occurs between the electrode core and the electrode sheath. This ensures a gas-tight connection between the electrode sheath and the electrode core and, when the measuring electrodes according to the invention are inserted in the measuring tube in a gas-tight manner, a gas-tight termination of the measuring tube in the area of the measuring electrodes.

Thus, it is provided in one design, whose goal, in particular, is the connection between the electrode sheath and the electrode core, that the second method step is carried out at a point in time after the first method step, that a molecular bond is created between the electrode core and the electrode sheath. For this purpose, the electrode sheath preferably still has a sufficiently high temperature for the connection with the material of the electrode core.

In one design, the electrode sheath is produced with at least one structure component in the first method step that, in the second method step, forms a gas-tight connection with the electrode core. In one variation, the structure component is at least partially implemented in a step-like manner. In one design, the structure component of the electrode sheath is designed as a type of indentation or undercut, so that the step shape extends radially further outwardly from the face of the measuring electrode, which faces the interior of the measuring tube in the mounted state. In one design, the structure component is at least partially designed so that it melts, either on its own or due to the insertion of the material of the electrode core or, respectively due to the temperature thereof and then forms a connection to the electrode core. The structure component is thus, in one design, correspondingly thin, so that it at least partially melts in a second method step.

In one design, the electrode sheath is produced as part of a measuring tube. The measuring tube is thereby an example for a component that is in contact with the medium or the process. The measuring tube in this design is, in particular, a pipe or a channel in which the medium is guided and from which a measured value is to be determined. Thus, in one design, the measuring tube is a part of a flowmeter and in a further design a part of a magnetic-inductive flowmeter. Alternatively, the electrode sheath is a part of a TDR fill level measuring device.

In order to produce the electrode sheath and the electrode core, in particular, a multi-component injection molding method or, in particular, a two-shot injection molding method is used. This, in particular, reduces costs and allows for a gas-tight connection. The two components are thereby preferably—as described above—of the same plastic, which only differs in view of its electrical conductivity.

In a further design, the electrode core is produced within the measuring tube and preferably within a recess of the measuring tube. The measuring tube is thus an implementation of the electrode sheath and the first method step of production of the electrode sheath is thus the production of the measuring tube.

In one design, it is provided for the electrical contact of the electrode core that the electrode core is produced with a recess for an electrode connection or that a recess in the electrode core is created for an electrode connection. In one variation, the electrode core is produced with a recess and in another variation, a recess is made in the already-produced electrode core. Thereby, the longitudinal axes of the electrode core and the recess are preferably perpendicular to one another.

In a design based thereupon, the electrode connection is produced in the recess or the electrode connection is placed in the recess. In the first variation, the recess in the electrode core is preferably also a shape for the electrode connection.

In a further design, the electrode connection is produced in the recess or the electrode connection is inserted in the recess so that a longitudinal axis of the measuring electrode and a longitudinal axis of the electrode connection are essentially perpendicular to one another. In particular, the above designs are part of the description of the longitudinal axes.

As described above in detail, there are various possibilities for designing and further developing the magnetic-inductive flowmeter according to the invention, which also holds true for the method according to the invention, as will be apparent from the following description of embodiments in conjunction with the accompanying drawings.

DETAILED DESCRIPTION OF THE INVENTION

Figure 1:
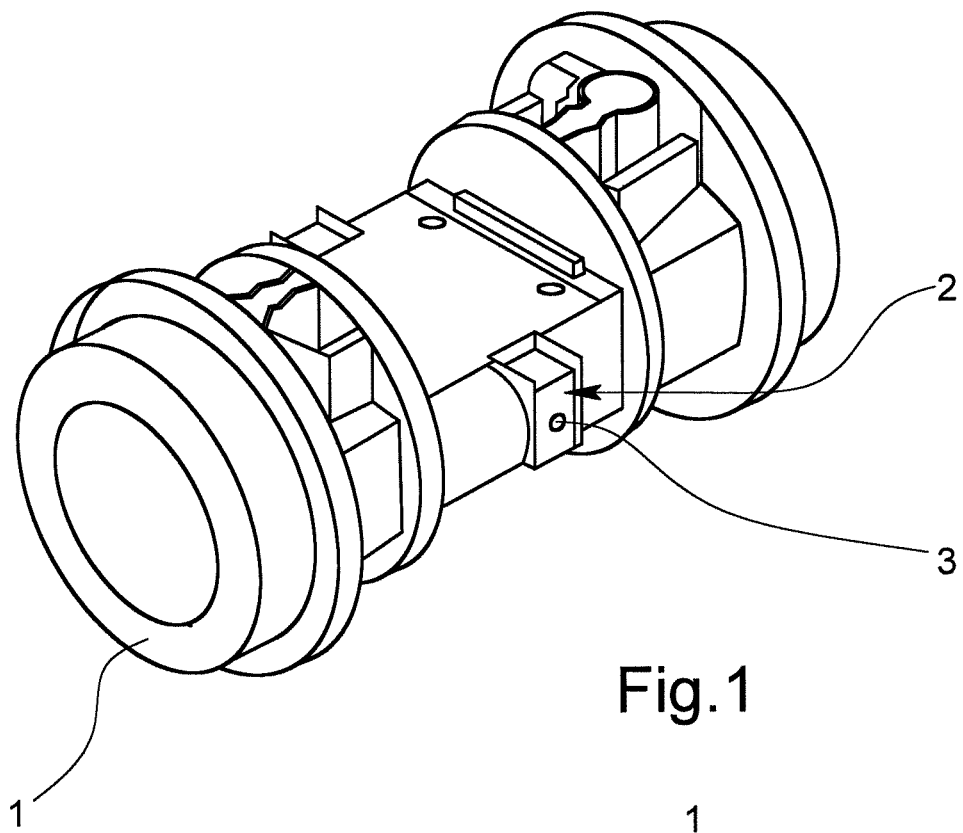
FIG. 1 is a perspective view of a measuring tube of a magnetic-inductive flowmeter according to the invention.
Figure 2:
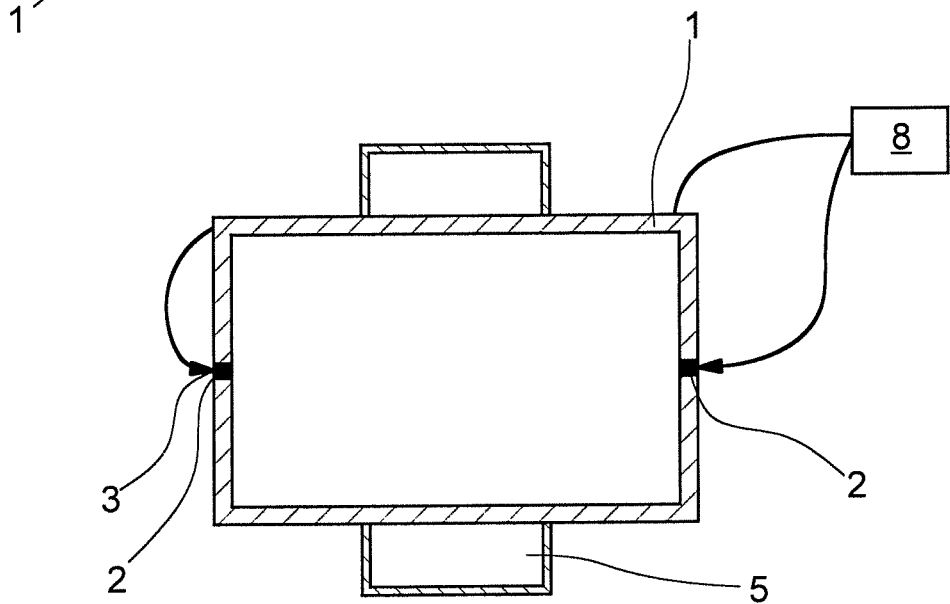
FIG. 2 is a schematic sectional view of a magnetic-inductive flowmeter.

FIG. 1 shows a measuring tube 1 with medium flowing through it, whose flow is to be measured, a magnetic field generator 5 for generating a magnetic field at least partially interfusing the measuring tube 1, two measuring electrodes 2 (in the example shown) for tapping a measuring voltage induced in the flowing medium, and an evaluation unit 8 of the magnetic-inductive flowmeter shown as an example (see. FIGS. 1 & 2).

Figure 3:
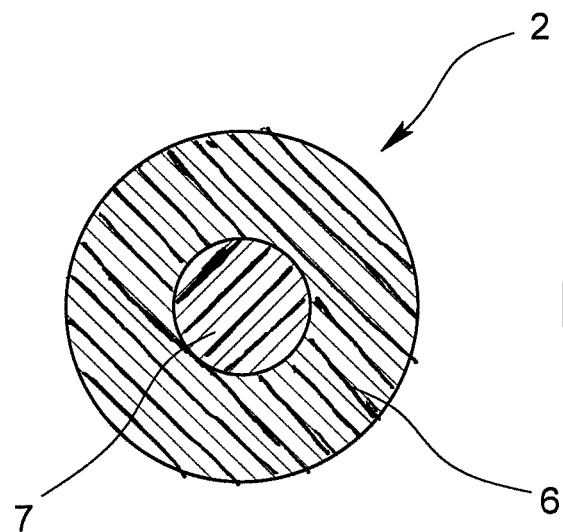
FIG. 3 is a schematic sectional view of a individual measuring electrode.

In the magnetic-inductive flowmeter, it is initially implemented that the measuring electrodes 2 are formed of an outer electrode sheath 6 of electrically non-conductive plastic and of an inner electrode core 7 of electrically conductive plastic (FIG. 3). Preferably, it is thereby additionally implemented that the electrode sheath 6 and the electrode core 7 are produced using injection molding. A plastic having a relatively high processing temperature is used thereby for the electrode sheath 6 and the electrode core 7. This is, in particular, the same plastic, which is electrically conductive in one case—for the electrode core 7—and electrically non-conductive for another case, i.e., for the electrode sheath 6. Specifically, PEEK (polyetheretherketone) is used as the plastic for the electrode sheath 6 and the electrode core 7. Alternatively, for example, the material polysulfone (PSU) is used.

FIG. 3 shows the implementation of a measuring electrode 2 having an electrode sheath 6 in the form of a hollow cylinder having a circular cross section and also having a cylindrical electrode core 7.

The measuring electrodes 2 additionally have an outer electrode connection 3. This electrode connection 3 is partially provided within the electrode core 7, preferably with a press fit. For this, the embodiment of FIG. 4 of the electrode core 7 has a cylindrical recess 4. In an alternative design, the electrode connection 3 is also produced using injection molding in the recess 4 of the measuring electrode 2 or, respectively, specifically of the electrode core 7. The longitudinal axis 11 of the recess 4 thereby runs—regardless of the method of production or attachment—in particular, perpendicular to the longitudinal axis 10 of the measuring electrode 2.

Figure 4:
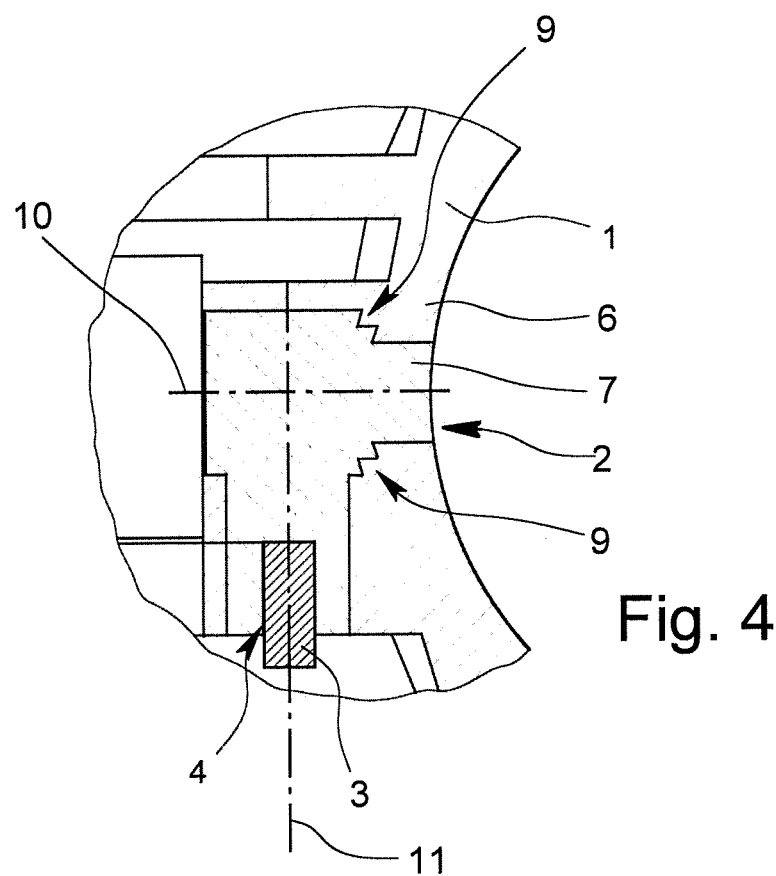
FIG. 4 is an enlarged sectional view of a portion a measuring tube of a magnetic-inductive flowmeter according to the invention.

In the embodiment of FIG. 4, the measuring tube 1 forms the electrode sheath 6 for accommodating and forming the electrode core 7. The electrode sheath 6 has a step-like or terraced structure component 9, which ensures for a pressure-tight connection between electrode sheath 6 and core 7. The structure component 9 of the electrode sheath 6 extends, in the shown example, into the electrode core 7 with two cross-sectionally spike-shaped, circumferential sealing lips.

What is claimed is:

1. A method for producing a magnetic-inductive flowmeter for measuring flow of a medium flowing longitudinally through a measuring tube thereof, the method comprising:
producing an electrode sheath by injection molding an electrically non-conductive plastic, the injection molded sheath forming the measuring tube and defining a recess within a wall thereof; and
producing an electrode core by injection molding an electrically conductive plastic to fill the wall recess, the injection molded core comprising a longitudinal axis extending perpendicular to the longitudinal flow direction of the measuring tube and comprising a core section extending essentially perpendicular with respect to each of the longitudinal axis of the electrode core and the longitudinal flow direction, and the core section being enclosed within the interior of said wall except for an outermost face of the core section from which a cylindrical recess is defined within the core section extending along the essentially perpendicular direction for accommodating an outer electrode connection.

2. A method according to claim 1, wherein the injection molded electrode sheath comprises a structure component forming a gas-tight connection with the injection molded electrode core.

3. A method according to claim 2, wherein the structure component is a step-like or terraced structure component defining a corresponding step-like or terraced shape adopted by the injection molded electrode core.

4. A method according to claim 3, wherein the structure component extends into the electrode core with two cross-sectionally spike-shaped circumferential sealing lips.

5. A method according to claim 1, wherein the injection molding of the electrode core is carried out at such a point in time after the injection molding of the electrode sheath that a molecular bond is formed between the injection molded electrode core and the injection molded electrode sheath.

6. A method according to claim 1, further comprising injection molding the electrode connection into the recess of the electrode core.

7. A method according to claim 1, further comprising inserting the electrode connection into the recess of the electrode core.

8. A method according to claim 1, wherein an innermost surface of the injection molded electrode core and an innermost surface of the measuring tube are coextensive with one another so as to define a conduit through which the medium flows.

9. A method according to claim 1, wherein a second of said sheath recess is formed so that the sheath recesses are opposed from one another, and wherein a second of said electrode core is injection molded into the second sheath recess.

10. A method according to claim 9, wherein said flowmeter further comprises a magnetic field generator for generating a magnetic field at least partially interfusing the measuring tube.

* * * * *